(12) United States Patent
Lu

(10) Patent No.: US 8,639,379 B2
(45) Date of Patent: Jan. 28, 2014

(54) DETECTING DEVICE AND DETECTING METHOD

(75) Inventor: Yu Lu, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 637 days.

(21) Appl. No.: 12/840,606

(22) Filed: Jul. 21, 2010

(65) Prior Publication Data

US 2011/0022213 A1 Jan. 27, 2011

(30) Foreign Application Priority Data

Jul. 24, 2009 (CN) .......................... 2009 1 0089826

(51) Int. Cl.
*G06F 19/00* (2011.01)

(52) U.S. Cl.
USPC ............ 700/178; 700/108; 700/121; 700/125

(58) Field of Classification Search
USPC ......................................... 700/108, 121, 125
See application file for complete search history.

(56) References Cited

U.S. PATENT DOCUMENTS

| | | | | |
|---|---|---|---|---|
| 7,991,497 B2 * | 8/2011 | Lin et al. | ....................... | 700/108 |
| 8,041,443 B2 * | 10/2011 | Funakoshi | .................... | 700/110 |
| 2001/0017682 A1 | 8/2001 | Kim | | |
| 2002/0095234 A1 * | 7/2002 | Yoshida | ........................ | 700/125 |
| 2002/0147520 A1 * | 10/2002 | Mos et al. | ...................... | 700/125 |
| 2009/0096758 A1 * | 4/2009 | Hotelling et al. | ............. | 345/173 |
| 2009/0146945 A1 | 6/2009 | Cho | | |

FOREIGN PATENT DOCUMENTS

| | | |
|---|---|---|
| CN | 1804694 A | 7/2006 |
| CN | 201035275 A | 3/2008 |

* cited by examiner

*Primary Examiner* — Mohammad Ali
*Assistant Examiner* — Sheela S Rao
(74) *Attorney, Agent, or Firm* — Ladas & Parry LLP

(57) ABSTRACT

A detecting device for preventing a substrate from being scratched by an apparatus and a detecting method using the same is provided. The device comprises a detecting substrate, a controlling module, a transmitting module and a monitoring module. The controlling module detects a position information of a contact point between the apparatus and the detecting substrate and transmits the position information to the transmitting module. The transmitting module transmits the position information received from the controlling module to the monitoring module. The monitoring module determines the coordinates of the contact point between the apparatus and the detecting substrate according to the position information. The detecting substrate can be employed to simulate the substrate used in the real manufacture process of the TFT-LCD so that the apparatus in each step can be detected before the real manufacture process is performed. Thus, the apparatus can be adjusted before the real manufacture process is performed, and therefore the substrate can be effectively prevented from being scratched by the apparatuses in the real manufacture process.

13 Claims, 2 Drawing Sheets

DETECTING DEVICE AND DETECTING METHOD

BACKGROUND

Embodiments of the present invention relate to a detecting device and a detecting method, and particularly to a detecting device for preventing a substrate from being scratched by an apparatus and a detecting device using the same.

The manufacture process of thin film transistor liquid crystal display (TFT-LCD) comprises a plurality of steps and thus employs a plurality of apparatuses. If the apparatus in a certain step malfunctions or upon readjustment, the apparatus would likely abnormally contact the substrate so that the substrate, especially the thin film transistor on the substrate is scratched in the process of handling the substrate by using the apparatus. Because the scratches on the substrate generally can only be detected by a subsequent detecting step, a plurality of substrates may be damaged before the scratch can be detected, and thus a heavy loss is suffered. In addition, after the scratch is detected, it would take a long time to identify the apparatus causing the scratch and eliminate the malfunction, thus the manufacture process is delayed and a further loss might occur.

In view of the above problems, it is desired to provide a detecting device for effectively preventing the substrate from being scratched by the apparatus and a detecting method using the detecting device.

SUMMARY OF THE INVENTION

According to an embodiment of the invention, a detecting device for preventing a substrate from being scratched by an apparatus is provided. The device comprises a detecting substrate, a controlling module, a transmitting module and a monitoring module. The controlling module is used to detect a position information of a contact point between the apparatus and the detecting substrate and transmit the position information to the transmitting module. The transmitting module is used to transmit the position information received from the controlling module to the monitoring module. The monitoring module is used to determine the coordinates of the contact point between the apparatus and the detecting substrate according to the position information.

According to an embodiment of the invention, a detecting method for preventing a substrate from being scratched by an apparatus is provided. The method comprises: detecting a position information of a contact point between the apparatus and a detecting substrate and transmitting the position information to a transmitting module by a controlling module; transmitting the position information received from the controlling module to a monitoring module by the transmitting module; and determining the coordinates of the contact point between the apparatus and the detecting substrate by the monitoring module according to the position information.

According to the embodiments of the invention, the detecting substrate is employed to simulate the substrate used in the real manufacture process of the TFT-LCD so that the apparatus in each step can be detected before the real manufacture process is performed. Thus, the apparatus can be adjusted before the real manufacture process is performed, and therefore the substrate can effectively prevent from being scratched by the apparatuses in the real manufacture process.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE EMBODIMENTS

Figure 1:
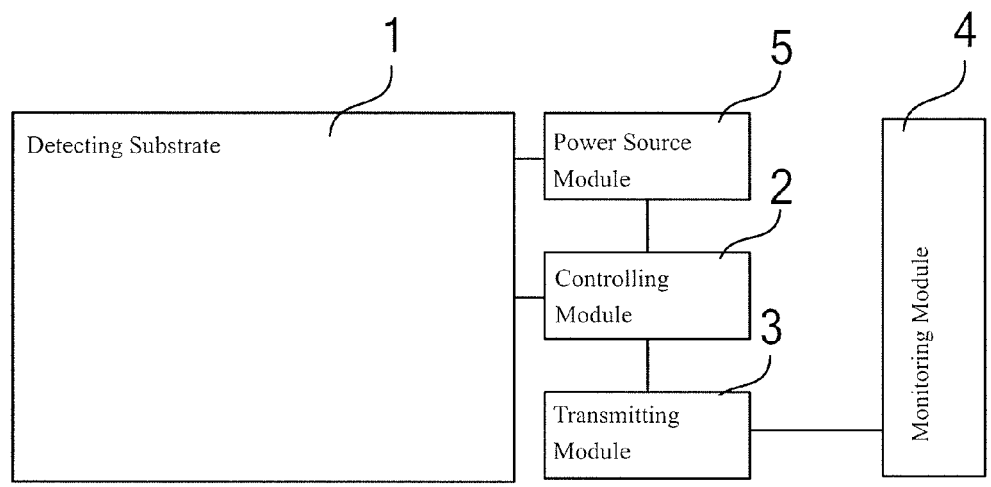
FIG. 1 is a structural schematic view showing a detecting device for preventing a substrate from being scratched by an apparatus according to an embodiment of the invention.

FIG. 1 is a structural schematic view showing a detecting device for preventing a substrate from being scratched by an apparatus according to an embodiment of the invention. As shown in FIG. 1, the device comprises a detecting substrate 1, a controlling module 2, a transmitting module 3 and a monitoring module 4. The controlling module 2 can be used to detect the position information of the contact point between the apparatus and the detecting substrate 1 and transmit the position information to the transmitting module 3. The transmitting module 3 transmits the position information received from the controlling module 2 to the monitoring module 4. The monitoring module 4 can be used to determine the coordinates of the contact point between the apparatus and the detecting substrate 1 according to the position information.

The monitoring module 4 can be further used to determine whether the coordinate values of the contact point between the apparatus and the detecting substrate 1 are the same as pre-stored coordinate values of a normal contact point. If they are the same, the contact point between the apparatus and the detecting substrate is determined as a normal contact point; if they are not the same, the contact point between the apparatus and the detecting substrate is determined as an abnormal contact point.

For example, the detecting substrate 1 has a size substantially same as that of the substrate employed in real manufacture process, thus it can be used to simulate the substrate employed in real manufacture process. The controlling module 2 and the transmitting module 3 may be provided on the sides of the detecting substrate 1. The detecting substrate 1, the controlling module 2 and the transmitting module 3 may be packaged to form an integral structure. In addition, a protection layer may be formed on the outer surface of the integral structure. For example, the protection layer may be formed by a temperature-proof, waterproof and acid-proof material such as tetrafluoroethylene.

For example, the detecting substrate 1 may be a substrate with a multiple-points touch screen function. The transmitting module 3 may be a wireless transmitting module for transmitting data to the monitoring module 4 in a wireless mode.

If the detected position information is an analogue signal, the controlling module 2 may perform an analogue-to-digital conversion on the detected position information and transmit the digitalized position information to the transmitting module 3.

The coordinate values of the normal contact point prestored in the monitoring module 4 are the coordinate value of the normal contact point between the apparatus and the substrate in the real manufacture process.

In addition, the detecting device in this embodiment may further comprise a power source module 5. The power source module 5 can be connected with the controlling module and supplies power to the controlling module 2. For example, the power source module 5 can be selected from a lead storage battery, a button lithium battery or any other suitable battery. The power source module 5 may be provided on the sides of the detecting substrate 1 and packaged together with the detecting substrate 1, the controlling module 2 and the transmitting module 3 to form an integral structure.

Before the manufacture process of the TFT-LCD is performed, the apparatus in each step can be detected by using the detecting device in this embodiment. Specifically, the detecting substrate 1 can replace the substrate employed in the real manufacture process and undergo the real manufacture process to detect the apparatus in each step. When the detecting substrate is handled by a certain apparatus, the controlling module 2 detects the position information of the contact point between this apparatus and the detecting substrate 1, and then the monitoring module 4 determines the coordinates of the contact point between this apparatus and the detecting substrate 1 according to the position information. The monitoring module 4 can be further used to compare the coordinate values of the contact point between the apparatus and the detecting substrate 1 and that of the normal contact point previously stored. If they are not the same, the contact point between the apparatus and the detecting substrate 1 is determined as an abnormal contact point, that is, it is determined that the apparatus abnormally operates. Thus, the apparatus can be adjusted before the real manufacture process of the TFT-LCD is performed, and accordingly the substrate can effectively prevent from being scratched by the apparatus in the real manufacture process.

Figure 2:
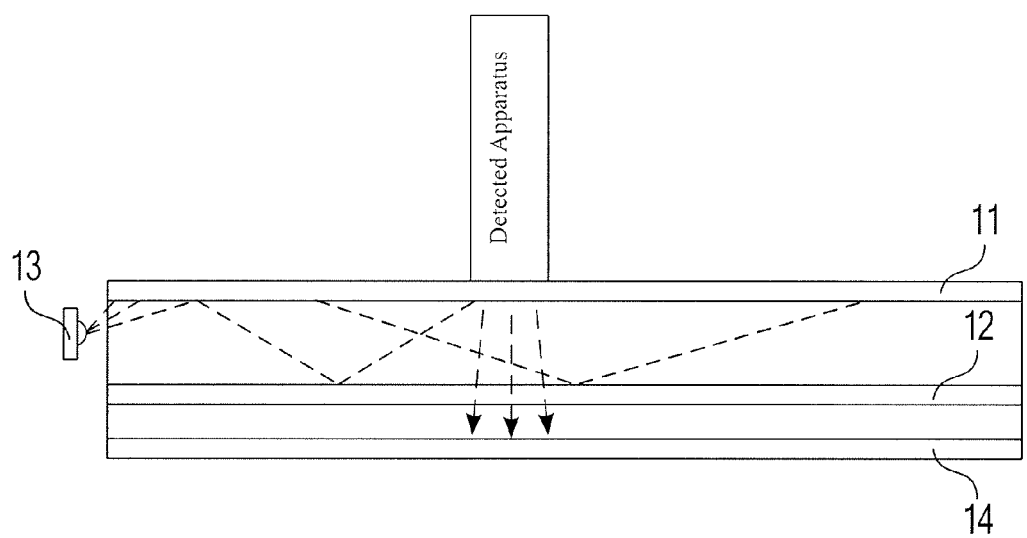
FIG. 2 is a structural schematic view showing a detecting substrate according to an embodiment of the invention.

Hereinafter, examples of the detecting device for preventing the substrate from being scratched by the apparatus will be described in detail. In one example, the detecting substrate 1 can be manufactured by using a frustrated total internal reflection (FTIR) multiple-points touch screen. FIG. 2 is a structural schematic view showing the detecting substrate 1. As shown in FIG. 2, the detecting substrate 1 comprises an upper substrate 11, a lower substrate 12, a light emitting diode (LED) 13 provided on the sides of the upper substrate 11 and the lower substrate 12, and a photodetector 14 provided on the lower surface of the lower substrate 12. The LED 13 and the photodetector 14 are respectively connected with a controlling device. The LED 13, the photodetector 14 and the controlling device constitute the controlling module 2. The controlling device controls the LED 13 to irradiate a light in an angle from the sides of the upper substrate 11 and the lower substrate 12 to the lower surface of the upper substrate 11 or to the upper surface of the lower substrate 12. A total reflection of the irradiated light occurs between the upper substrate 11 and the lower substrate 12. When the apparatus contacts the upper substrate 11, that is, when the apparatus is pressed onto the upper surface of the upper substrate 11, the total reflection between the upper substrate 11 and the lower substrate 12 is destroyed at the contact point, and thus a portion of the light transmits to the surface of the apparatus through the upper substrate 11. Since the surface of the apparatus generally is uneven, the light impinged on apparatus is scattered. The scattered light then reaches the photodetector 14 through the upper substrate 11 and the lower substrate 12. The photodetector 14 converts the optical signal of the scattered light into an electric signal (i.e. the position information of the contact point between the apparatus and the detecting substrate 1) and transmits the electric signal to the controlling device, thus the position information of the contact point between the apparatus and the detecting substrate 1 is detected by the controlling module. The controlling device performs an analogue-to-digital conversion on the detected position information and transmits the digitalized position information to monitoring module 4 through the transmitting module 3. The monitoring module 4 determines the coordinates of the contact point between the apparatus and the detecting substrate 1 according to the digitalized position information. In addition, the monitoring module 4 further determines whether the coordinate values of the contact point between the apparatus and the detecting substrate 1 are the same as pre-stored coordinate values of a normal contact point. If they are the same, the contact point between the apparatus and the detecting substrate is determined as a normal contact point; if they are not the same, the contact point between the apparatus and the detecting substrate is determined as an abnormal contact point. When the contact point between the apparatus and the detecting substrate is determined as an abnormal contact point, it can be determined that the apparatus operates abnormally and needs adjustment.

Preferably, the detecting substrate 1 simulates the substrate employed in the real manufacture process and thus it has a thickness substantially same as that of the substrate employed in the real manufacture process. For example, if the thickness of the substrate employed in the real manufacture process is 0.6 mm, the total thickness of the detecting substrate 1 can be about 0.6 mm. In this case, both the upper substrate 11 and the lower substrate 12 may be formed by a transparent thin substrate with a thickness smaller than 0.1 mm. Such transparent thin substrate may be temperature-proof, water-proof and oxygen-proof.

In another example, the detecting substrate 1 can be manufactured by using an infrared multiple-points touch screen. For example, infrared emitting elements and infrared receiving elements are provided around the detecting substrate 1 to form an infrared matrix with intersecting lines. When the apparatus contacts the detecting substrate 1, the infrared light ray at the contact point is blocked by the apparatus. In this case, the controlling module 2 detects the position information of the contact point between the apparatus and the detecting substrate 1 according to the above infrared variation. The controlling module 2 transmits the position information to the monitoring module 4 through the transmitting module 3. The monitoring module 4 determines the coordinates of the contact point between the apparatus and the detecting substrate 1 according to the position information. In addition, the monitoring module 4 further determines whether the coordinate values of the contact point between the apparatus and the detecting substrate 1 are the same as pre-stored coordinate values of a normal contact point. If they are the same, the contact point between the apparatus and the detecting substrate is determined as a normal contact point; if they are not the same, the contact point between the apparatus and the detecting substrate is determined as an abnormal contact point. When the contact point between the apparatus and the detecting substrate is determined as an abnormal contact point, it can be determined that the apparatus operates abnormally and needs adjustment. In addition, if the detected position information is an analogue signal, the controlling module 2 may perform an analogue-to-digital conversion on the detected position information and transmit the digitalized position information to the monitoring module 4 through the transmitting module 3. In addition, the detecting substrate 1 may be manufactured by using any other types of touch screens.

According to the above embodiments, the detecting substrate is employed to simulate the substrate used in the real manufacture process of the TFT-LCD so that the apparatus in each step can be detected before the real manufacture process is performed. When the contact point between the apparatus and the detecting substrate is determined as an abnormal contact point, it can be determined that the apparatus operates abnormally. Thus, the apparatus can be adjusted before the real manufacture process is performed, and therefore the substrate can effectively be prevented from being scratched by the apparatuses in the real manufacture process.

Figure 3:
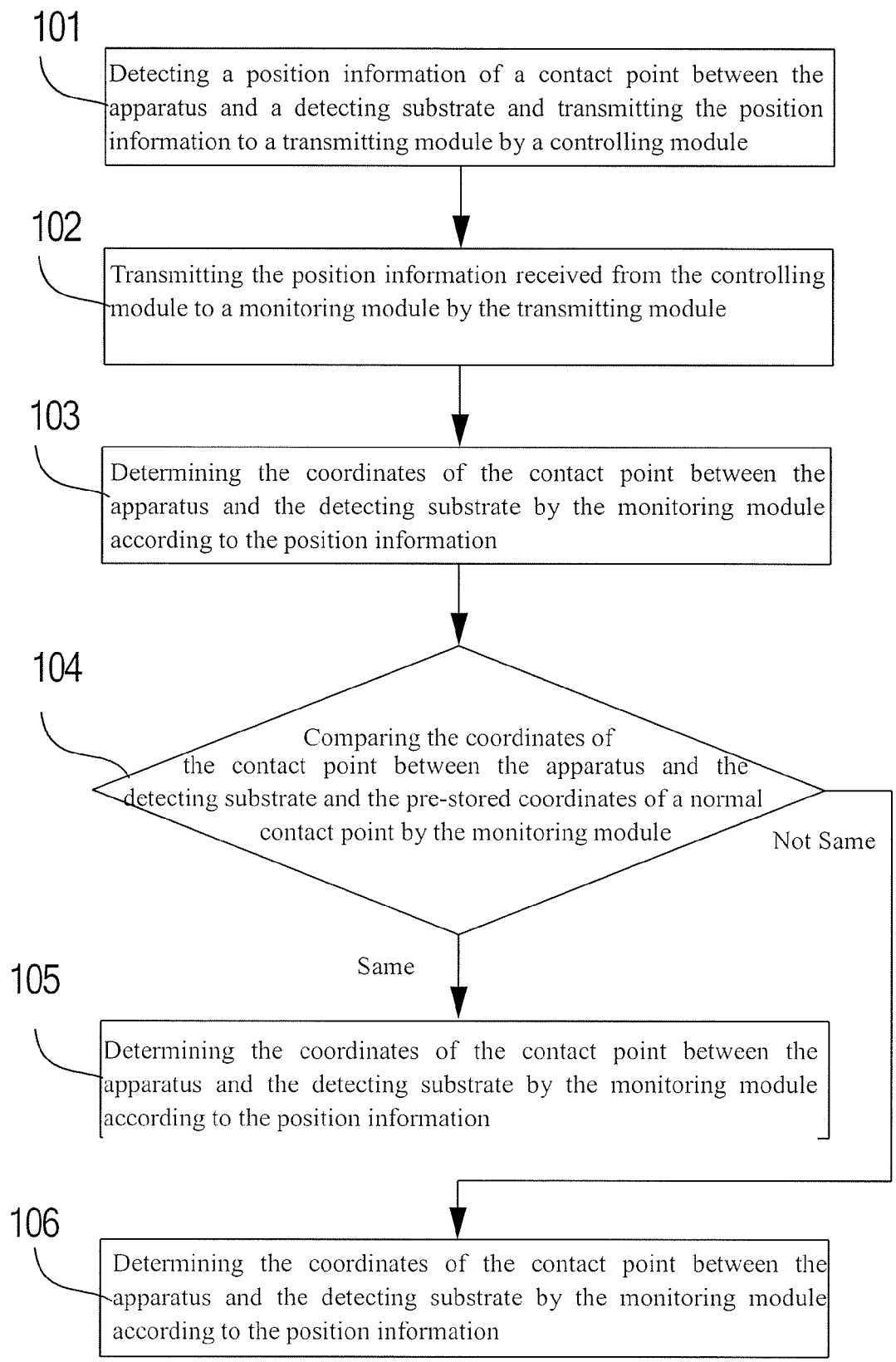
FIG. 3 is a flow chart showing a detecting method for preventing a substrate from being scratched by an apparatus according to an embodiment of the invention.

FIG. 3 is a flow chart showing a detecting method for preventing a substrate from being scratched by an apparatus according to an embodiment of the invention. As shown in FIG. 3, the method comprises: step 101 of detecting the position information of the contact point between the apparatus and the detecting substrate and transmitting the position information to the transmitting module by the controlling module; step 102 of transmitting the position information received from the controlling module to the monitoring module by the transmitting module; and step 103 of determining the coordinates of the contact point between the apparatus and the detecting substrate by the monitoring module according to the position information.

In addition, this embodiment may further comprise step 104 of comparing the coordinates of the contact point between the apparatus and the detecting substrate and pre-stored coordinates of a normal contact point by the monitoring module after the coordinates of the contact point between the apparatus and the detecting substrate are determined. If they are the same, the contact point between the apparatus and the detecting substrate is determined as a normal contact point (step 105); if they are not the same, the contact point between the apparatus and the detecting substrate is determined as an abnormal contact point (step 106).

The detecting substrate in this embodiment may be manufactured by using a resistance touch screen, an infrared touch screen and any other types of touch screen. In addition, in step 102, the transmitting module 3 may transmit the position information received from the controlling module to the monitoring module 4 in a wireless mode.

According to this embodiment, the detecting substrate is employed to simulate the substrate used in the real manufacture process of the TFT-LCD so that the apparatus in each step can be detected before the real manufacture process is performed and the coordinates of the contact point between the apparatus and the detecting substrate can be determined. When the contact point between the apparatus and the detecting substrate is determined as an abnormal contact point, it can be determined that the apparatus operates abnormally. Thus, the apparatus can be adjusted before the real manufacture process is performed, and therefore the substrate can effectively be prevented from being scratched by the apparatuses in the real manufacture process.

It should be appreciated that the embodiments described above are intended to illustrate but not limit the present invention. Although the present invention has been described in detail herein with reference to the preferred embodiments, it should be understood by those skilled in the art that the present invention can be modified and some of the technical features can be equivalently substituted without departing from the spirit and scope of the present invention.

What is claimed is:

1. A detecting device for preventing a substrate from being scratched by an apparatus, comprising a detecting substrate, a controlling module, a transmitting module and a monitoring module, wherein
   the controlling module detects a position information of a contact point between the apparatus and the detecting substrate and transmit the position information to the transmitting module;
   the transmitting module transmits the position information received from the controlling module to the monitoring module;
   the monitoring module determines the coordinates of the contact point between the apparatus and the detecting substrate according to the position information,
   wherein the detecting substrate is a multiple-points touch screen.

2. The detecting device according to claim 1, wherein the monitoring module further determines whether the coordinates of the contact point between the apparatus and the detecting substrate are the same as pre-stored coordinates of a normal contact point, if they are the same, the contact point between the apparatus and the detecting substrate is determined as a normal contact point, if they are not the same, the contact point between the apparatus and the detecting substrate is determined as an abnormal contact point.

3. The detecting device according to claim 1, wherein a thickness of the detecting substrate is same as that of a substrate employed in a real manufacture process.

4. The detecting device according to claim 1, wherein the detecting substrate is a Frustrated Total Internal Reflection (FTIR) multiple-points touch screen or an infrared multiple-points touch screen.

5. The detecting device according to claim 1, wherein the controlling module further performs an analogue-to-digital conversion on the detected position information and transmits the digitalized position information to the transmitting module.

6. The detecting device according to claim 1, wherein the detecting substrate, the controlling module and the transmitting module are packaged to form an integral structure.

7. The detecting device according to claim 6, wherein a protection layer is formed on an outer surface of the integral structure, the protection layer is formed by a temperature-proof, waterproof and acid-proof material.

8. The detecting device according to claim 1, wherein the transmitting module is a wireless transmitting module.

9. A detecting method for preventing a substrate from being scratched by an apparatus, comprising:
   step (101) of detecting a position information of a contact point between the apparatus and a detecting substrate and transmitting the position information to a transmitting module by a controlling module;
   step (102) of transmitting the position information received from the controlling module to a monitoring module by the transmitting module;
   and step (103) of determining the coordinates of the contact point between the apparatus and the detecting substrate by the monitoring module according to the position information,
   wherein the detecting substrate is a multiple-points touch screen.

10. The detecting method according to claim 9, further comprising:
   step (104) of comparing the coordinates of the contact point between the apparatus and the detecting substrate and the pre-stored coordinates of a normal contact point by the monitoring module, wherein if they are the same, the contact point between the apparatus and the detecting substrate is determined as a normal contact point; if they are not the same, the contact point between the apparatus and the detecting substrate is determined as an abnormal contact point.

11. The detecting method according to claim 9, wherein the detecting substrate is a Frustrated Total Internal Reflection (FTIR) multiple-points touch screen or an infrared multiple-points touch screen.

12. The detecting method according to claim 9, wherein in the step (102), the transmitting module transmits the position information to the monitoring module in a wireless mode.

13. The detecting method according to claim 9, wherein in the step (101), the controlling module performs an analogue-to-digital conversion on the detected position information and transmits the digitalized position information to the transmitting module.

\* \* \* \* \*